D. W. SEELEY.
Churn.
No. 33,164. Patented Aug. 27, 1861.
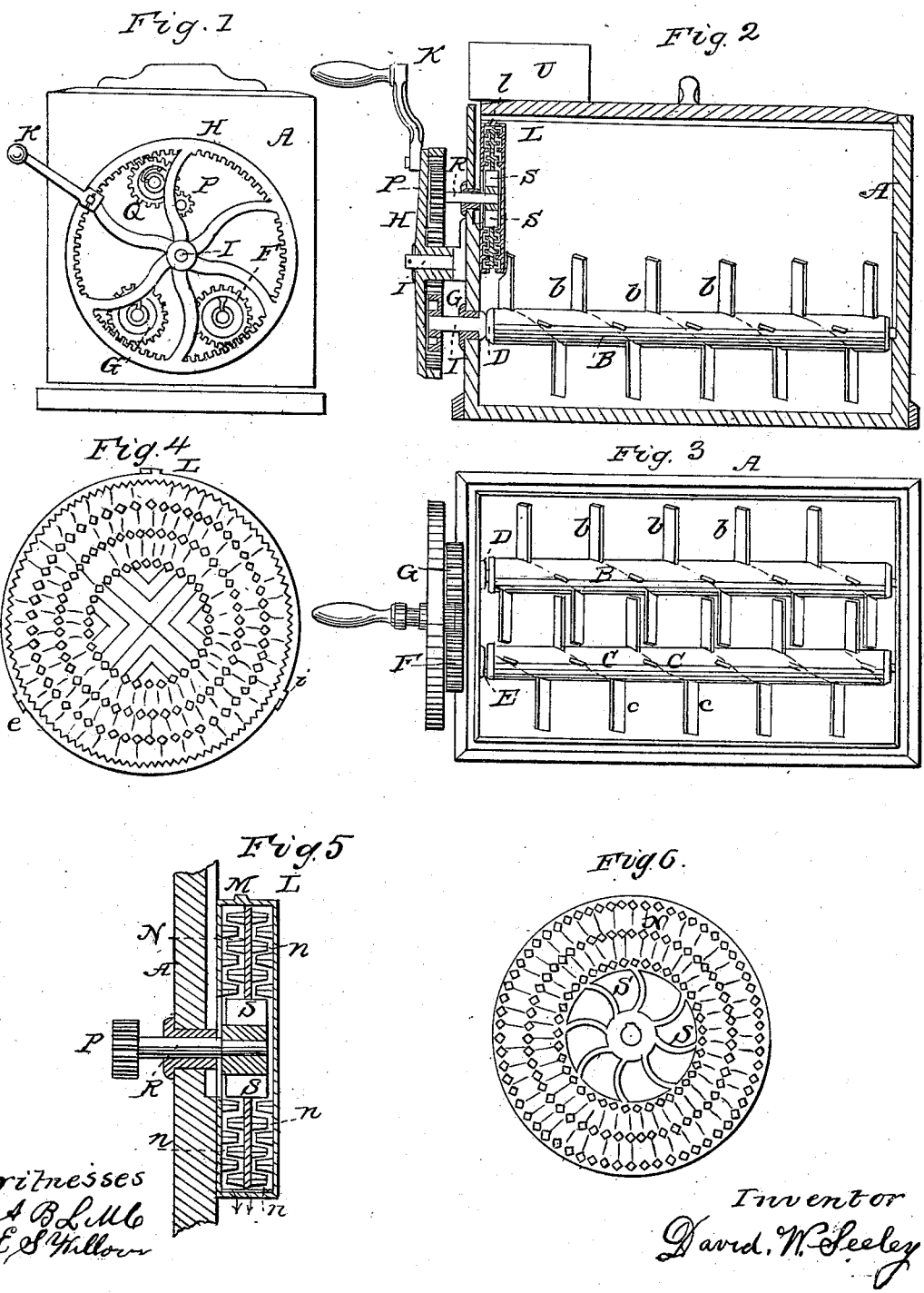

UNITED STATES PATENT OFFICE.

DAVID W. SEELEY, OF ALBANY, NEW YORK.

IMPROVEMENT IN CHURNS.

Specification forming part of Letters Patent No. 33,164, dated August 27, 1861.

*To all whom it may concern:*

Be it known that I, DAVID W. SEELEY, of Albany, in the county of Albany and State of New York, have invented a new and Improved Churn, which for perfect and easy working and economy in the power applied possesses advantages the nature of which will be clearly set forth in the following specification.

My improvement consists, first, in using two dashers placed side by side and having their beaters or arms placed upon each driving-shaft in the form of a screw, one being placed in advance of the other a sufficient distance to allow the beaters or arms to clear, so that when the driving-shafts are put in rapid motion the milk or cream, by the action of the double screw-dashers, is forced from one end of the churn to the other, thereby thoroughly agitating it and exposing every particle to the alternate action of each beater or arm. Each driving-shaft is provided with journals on one end and a socket-flange on the other to receive a shoulder, which is beveled so that the socket fits only in one position, and forms the inside of a stud, which passes through the end of the churn and works in a box and has a flange on the inside, which is chambered out to receive packing and prevent the churn from leaking. On the outer end of each stud is a pinion, which is made to slide on the same, and is provided with a spring which fits into a groove to keep it in or out of gear and work the dashers or disks separately or together. The driving-wheel revolves on a stud fixed on the end of the churn and has its teeth on the inside circumference, which mesh into the pinions and saves space, thereby making it more compact. The disks are placed above the dashers, out of the way of milk and cream, and are worked with or without the same. They consist of three plates, two of which form a shell or case and meet together to form a space between, in which a double face-plate revolves, and which has a series of teeth or diamond-shaped pins on each face, which is also corrugated with fine grooves and projections between said teeth or diamond-shaped pins, the center of a series of buckets and openings. The shell-disks are also corrugated with grooves and projections, and have teeth or diamond-shaped pins placed so as to come between those on the double face-plate. The inside shell or disk has a hole in the center and the double face-plate is driven at a great velocity, while the milk or cream conducted from above passes down through the hole in the center of the inside shell or disk and falls into the buckets or in the double face-plate and is driven from the same against the teeth or diamond-shaped pins by the centrifugal force, thereby thoroughly breaking up the globules of the milk or cream and forming particles of butter, which pass through the outlet in the bottom of the shell-disks into the churn, to be collected and worked by the double screw-dashers thrown into gear for that purpose.

I have tested my invention, and from one in present operation I find that the butter is made with less labor and diminished strain on the working parts.

Having thus explained the nature of my invention and to enable others skilled in the art to make and use the same, I will proceed to describe it, and certify that the accompanying drawings are a full and correct representation of the same, like letters conforming to like parts.

Figure 1 represents an end view of the churn ready for use. Fig. 2 is a longitudinal section of the same. Fig. 3 is a plan of the same, showing the pinions out of gear. Fig. 4 is one of the shell-disks half of the full size. Fig. 5 is a section of shell-disks and double face-plate in their relative positions. Fig. 6 is a view of one side of the double face-plate or beater.

A, Figs. 1, 2, and 3, represents the churn.

B and C, Figs. 2 and 3, are the driving-shaft revolving in bearings and provided with arms or beaters $b\,b\,b\,b$ and $c\,c\,c\,c$, placed in said shaft in the line of a screw, indicated in dotted lines. The arms or beaters play very close together, so as to subject the milk or cream to a thorough working.

D and E are studs which fit in the sockets on the driving-shafts B and C and project through one end of the churn and carry pinions F and G, which slide on said shafts in and out of gear, and have each a spring working in said studs to keep them in a required position.

H is the driving-wheel, provided with internal gear, and which revolves on a fixed stud I, secured to the churn A. K is the crank-handle for driving the same.

L, Fig. 4, represents the outside shell or disk half of the full size and provided with circular rows of teeth or diamond-shaped pins, the plates being corrugated between said teeth or pins with grooves and projections, as shown.

M is the inside plate secured to the end of the churn and having teeth or diamond-shaped pins arranged in a similar manner to L, and also having a hole in the center through which the milk or cream flows from the reservoir above. These shell-disks are held together by wedge-shaped lip $b$, cast on the outside of each.

N is a double-disk face-plate provided with teeth or diamond-shaped pins arranged alternately with those in the shell-disks. The center of this double face-plate is provided with openings and buckets S, connected to a hub, which is keyed to a shaft R, revolving in a box and provided with a pinion P on its outer end, connected to the driving-wheel H by an intermediate wheel Q, which revolves on a stud T. This wheel slides out of or into gear. The driving-wheel H being set in motion, the double face-plate N is made to revolve at a great velocity and the milk or cream from the hopper U falls through the hole in the disk M into the openings in the double face-plate N, and is driven from the arms or buckets S against the teeth or diamond-shaped pins by the centrifugal force. After being thoroughly worked it passes through the outlet in the bottom of the disks.

I do not claim double dashers, for such arrangements are an old device; but

I claim—

1. The use of two screw and parallel dashers constructed and operating substantially as described.

2. The sliding or movable pinions F, G, and P, together with the stationary driving-wheel H, for the purpose of working the disks or dashers separately or together, as set forth.

3. The double face-plate N, provided with teeth or diamond-shaped pins $n\ n\ n\ n$, revolving between the shell-disks L and M, when said double face-plate N is provided with buckets and openings at its center, substantially as and for the purpose specified.

4. The two screw-dashers B C, in combination with the double face-plate N, when constructed and operating as set forth.

DAVID W. SEELEY.

Witnesses:
A. B. LITTLE,
E. S. WILLSON.